(12) United States Patent
Eyers et al.

(10) Patent No.: US 9,682,338 B2
(45) Date of Patent: Jun. 20, 2017

(54) FILTER FRAME ADAPTER

(71) Applicant: BHA Altair, LLC, Franklin, TN (US)

(72) Inventors: William Eyers, Chobham (GB); Przemek Nikolin, Lower Earley (GB)

(73) Assignee: BHA Altair, LLC, Franklin, TN (US)

( * ) Notice: Subject to any disclaimer, the term of this patent is extended or adjusted under 35 U.S.C. 154(b) by 192 days.

(21) Appl. No.: 14/512,929

(22) Filed: Oct. 13, 2014

(65) Prior Publication Data
US 2016/0101379 A1    Apr. 14, 2016

(51) Int. Cl.
*B01D 46/00*  (2006.01)
*B01D 46/12*  (2006.01)

(52) U.S. Cl.
CPC ..... *B01D 46/0005* (2013.01); *B01D 46/0002* (2013.01); *B01D 46/008* (2013.01); *B01D 46/125* (2013.01)

(58) Field of Classification Search
CPC ............ B01D 46/0002; B01D 46/0005; B01D 46/0015; B01D 46/002; B01D 46/10; B01D 46/125; B01D 46/521
See application file for complete search history.

(56) References Cited

U.S. PATENT DOCUMENTS

| 4,584,005 | A | * | 4/1986 | Allan | B01D 46/0005 156/204 |
|---|---|---|---|---|---|
| 8,105,409 | B2 | | 1/2012 | Mann et al. | |
| 2010/0251681 | A1 | | 10/2010 | Gebert | |
| 2013/0074463 | A1 | * | 3/2013 | Kulkarni | B01D 46/0002 55/483 |

FOREIGN PATENT DOCUMENTS

WO    WO 2012/038317    3/2012

* cited by examiner

*Primary Examiner* — Robert Clemente
(74) *Attorney, Agent, or Firm* — Reinhart Boerner Van Deuren P.C.

(57) ABSTRACT

A filter apparatus is provided. The filter apparatus includes a filter element. The filter element includes filter media supported in a frame construction. The frame construction having opposed side panels and a rectangular border flange along a first end. The rectangular border flange projects outward from and extending around the opposed side panels. The first end is an inlet end or an outlet end of the filter element. The filter apparatus includes a filter frame adapter formed separately from the frame construction and secured to the frame construction to adapt the filter element for a different mounting interface. The filter frame adapter includes a pair of complimentary adapter flanges each projecting outward relative to one of the opposed side panels. The adapter flanges are at a second end that is opposite a first end. The second end is at the inlet end or the outlet end.

25 Claims, 18 Drawing Sheets

FILTER FRAME ADAPTER

FIELD OF THE INVENTION

The present invention relates generally to a filter assembly for use in a filter system. In particular, the present invention relates to a reusable filter frame adapter.

BACKGROUND OF THE INVENTION

Filters may be used to remove particles from air streams. For example, it may be desirable to remove particles from intake air streams to, e.g., gas turbine inlets, emergency power generators, gas compressors, HVAC systems, gas mining operations, etc. A partition may be provided separating a filtration unit into a dirty side and a clean side. The partition has openings in which filters are mounted. Over time, the filter media of a filter becomes spent, e.g., loaded with filtered particles, and the filter is replaced.

BRIEF SUMMARY OF THE INVENTION

One aspect of the invention relates to a filter apparatus. The filter apparatus includes a filter element. The filter element includes filter media supported in a frame construction. The frame construction having opposed side panels and a rectangular border flange along a first end. The rectangular border flange projects outward from and extending around the opposed side panels. The first end is an inlet end or an outlet end of the filter element. The filter apparatus includes a filter frame adapter formed separately from the frame construction and secured to the frame construction to adapt the filter element for a different mounting interface. The filter frame adapter includes a pair of complimentary adapter flanges each projecting outward relative to one of the opposed side panels. The adapter flanges are at a second end that is opposite a first end. The second end is at the inlet end or the outlet end.

Another aspect of the invention relates to a filter frame adapter extending from a first end to a second end. The filter frame adapter is configured to be releasably coupled to a filter having media and a border flange extending outwardly from the media. The filter frame adapter includes an upper wall extending from a first end to a second end. The upper wall includes a central portion and an end wall extending perpendicular to the central portion at the second end. The end wall is configured to abut the border flange of the filter. The filter frame adapter includes a lower wall spaced apart from the upper wall and extending from a first end to a second end. The lower wall includes a central portion extending parallel to the central portion of the upper wall and an end wall extending perpendicular to the central portion at the second end. The end wall is configured to abut the border flange of the filter. The filter frame adapter includes a first rail extending between the upper wall and the lower wall. The filter frame adapter includes a second rail spaced apart from the first rail extending between the upper wall and the lower wall. The upper wall, the lower wall, the first rail, and the second rail form a four-sided perimeter at the first end of the filter frame adapter configured to extend around the filter. The upper wall and the lower wall form a two-sided perimeter proximate the second end of the filter frame adapter.

Another aspect of the invention relates to a method of replacing filter media of a filter unit. The method includes removing the filter unit from an opening in a partition. The method includes removing a fastener from aligned apertures in a first filter having filter media and a flange extending around the filter media and a filter frame adapter extending from a first end to a second end having an upper mounting surface and a lower mounting surface at the second end each configured to mount to a flange of the first filter, the filter frame adapter also including a four-sided perimeter configured to extend around the filter media at the second end. The method includes aligning apertures in a second filter having filter media and a flange extending around the filter media with the apertures of the filter frame adapter. The method includes locating the fastener in the aligned apertures of the filter frame adapter and the second filter to couple the second filter to the filter frame adapter. The method includes coupling the filter frame adapter in the opening to the partition.

Another aspect of the invention relates to a filter frame adapter configured to couple a V-cell filter to a partition. The filter frame adapter includes a first wall including a central portion extending from a first end to a second end. The first wall includes a first end wall located at the first end. The first wall includes a second end wall located at the second end. The filter frame adapter includes a second wall including a central portion extending from a first end to a second end. The second wall includes a first end wall located at the first end. The first wall includes a second end wall located at the second end. The filter frame adapter includes a first rail extending between the first wall and the second wall. The filter frame adapter includes a second rail spaced apart from the first rail and extending between the first wall and the second wall. The filter frame adapter includes a fastener configured to releasably couple the filter frame adapter to the V-cell filter. At least one of the walls includes a first coupling feature configured allow the filter frame adapter to be releasably coupled to the partition.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to the Figures generally, an embodiment of a filter frame adapter is provided. The filter frame adapter is configured to be coupled to a filter, e.g., a V-cell filter, V-pleat filter, etc., to allow the filter to be mounted in an opening through a filtration unit dividing wall, e.g., partition, separating a clean side from a dirty side. The filter frame adapter allows various different types and/or sizes and/or configurations of filters to be mounted in the opening in the partition by various different mounting mechanisms. Additionally, when the filter media of the filter is spent, soiled, etc., the filter may be removed from the filter frame adapter and replaced in the filter frame adapter with a new filter, e.g., the filter frame adapter is reusable. Additionally, in one embodiment, the filter frame adapter is configured to allow a reverse filter to be fitted to a box filter holding frame. In one embodiment, the filter frame adapter is configured to be used with various different types of clamping mechanisms to couple the filter frame adapter and the filter in an opening in a partition.

Figure 1:
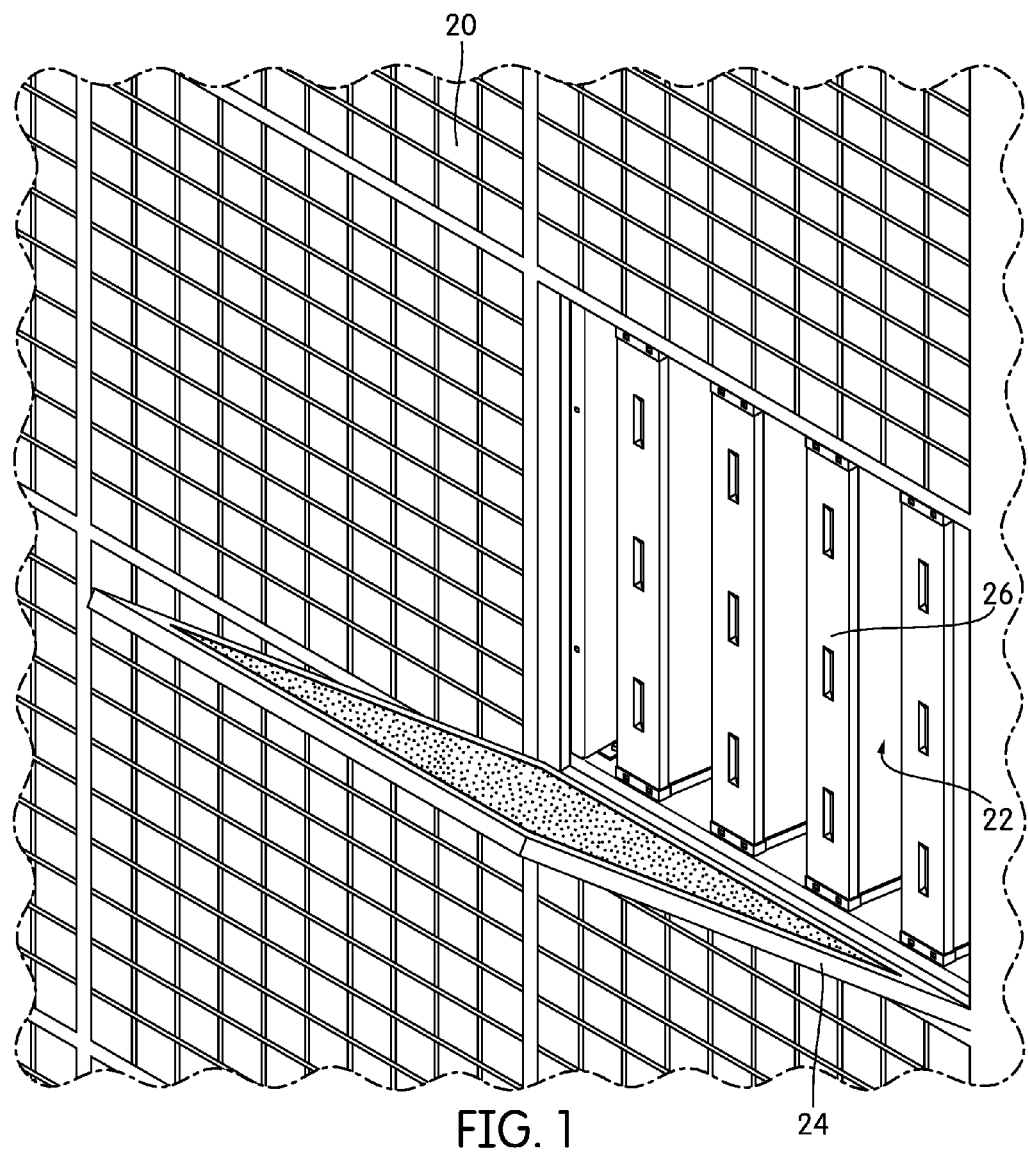
FIG. 1 is a perspective view of a filter unit located in an opening of a partition according to an exemplary embodiment.

With reference to FIG. 1, in one embodiment, a partition 20 is provided separating a dirty side from a clean side. The partition 20 includes a plurality of openings 22 each of which is covered by a closure 24. In one embodiment, the closures 24 include a pre-filter or pre-filter material. The closures 24 in a closed configuration are each configured to allow air flow therethrough from the dirty side to the filter unit 26 mounted in the opening 22 of the partition 20, while preventing access to and/or removal from the dirty side of the filter unit 26 mounted in the opening 22. The closures 24 are also moveable, e.g., pivotally movable, etc., to an open configuration in which the filter unit 26 may be accessed and/or removed from the dirty side from the opening 22 in the partition 20.

Figure 2:
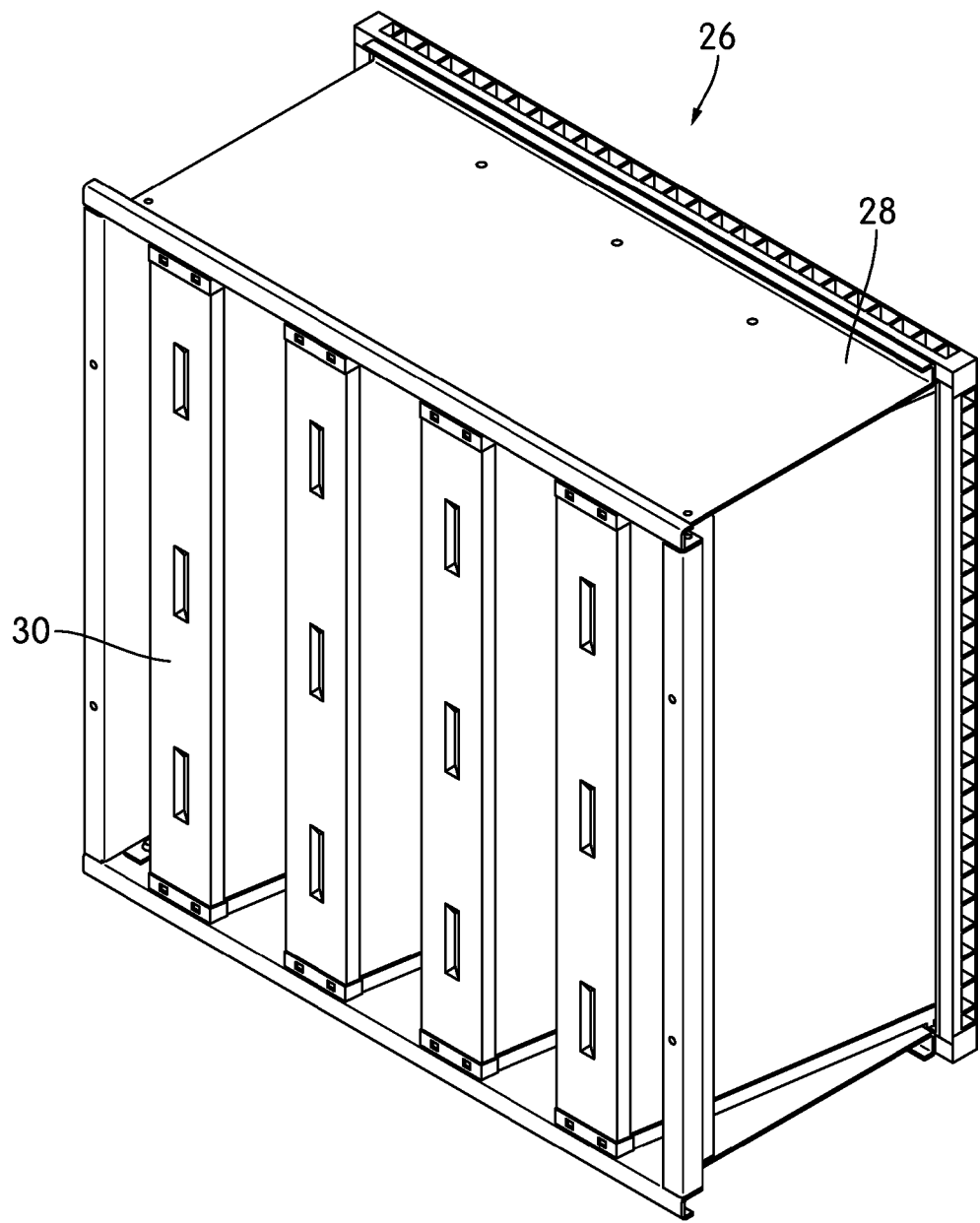
FIG. 2 is a perspective view of a filter unit according to an exemplary embodiment.
Figure 3:
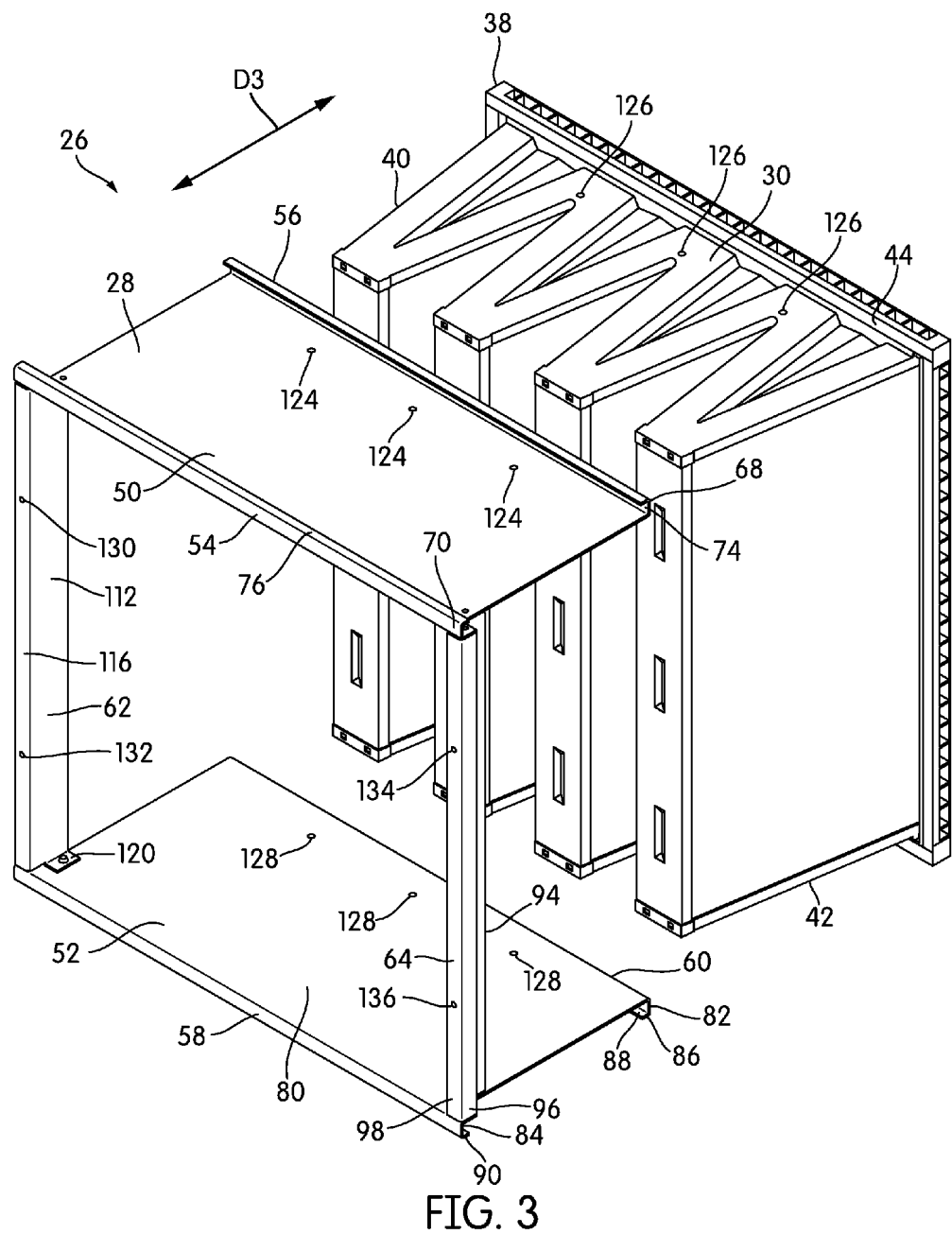
FIG. 3 is an exploded view of the filter unit of FIG. 2 according to an exemplary embodiment.

With reference to FIG. 2, the filter unit 26 according to an exemplary embodiment removed from the partition 20 is illustrated. The filter unit 26 includes a filter frame adapter 28 coupled to a filter element 30. The filter element 30 and the filter frame adapter 28 are separately formed and the filter element 30 is configured to be removed from the filter frame adapter 28, e.g., when the filter element 30 is spent, to be replaced, when the filter element 30 is to be replaced with a larger filter, etc. A new filter may then be coupled to the filter frame adapter 28 for mounting in an opening of a partition, e.g., see FIG. 1. FIG. 3 illustrates the filter element 30 removed from the filter frame adapter 28.

Figure 3A:
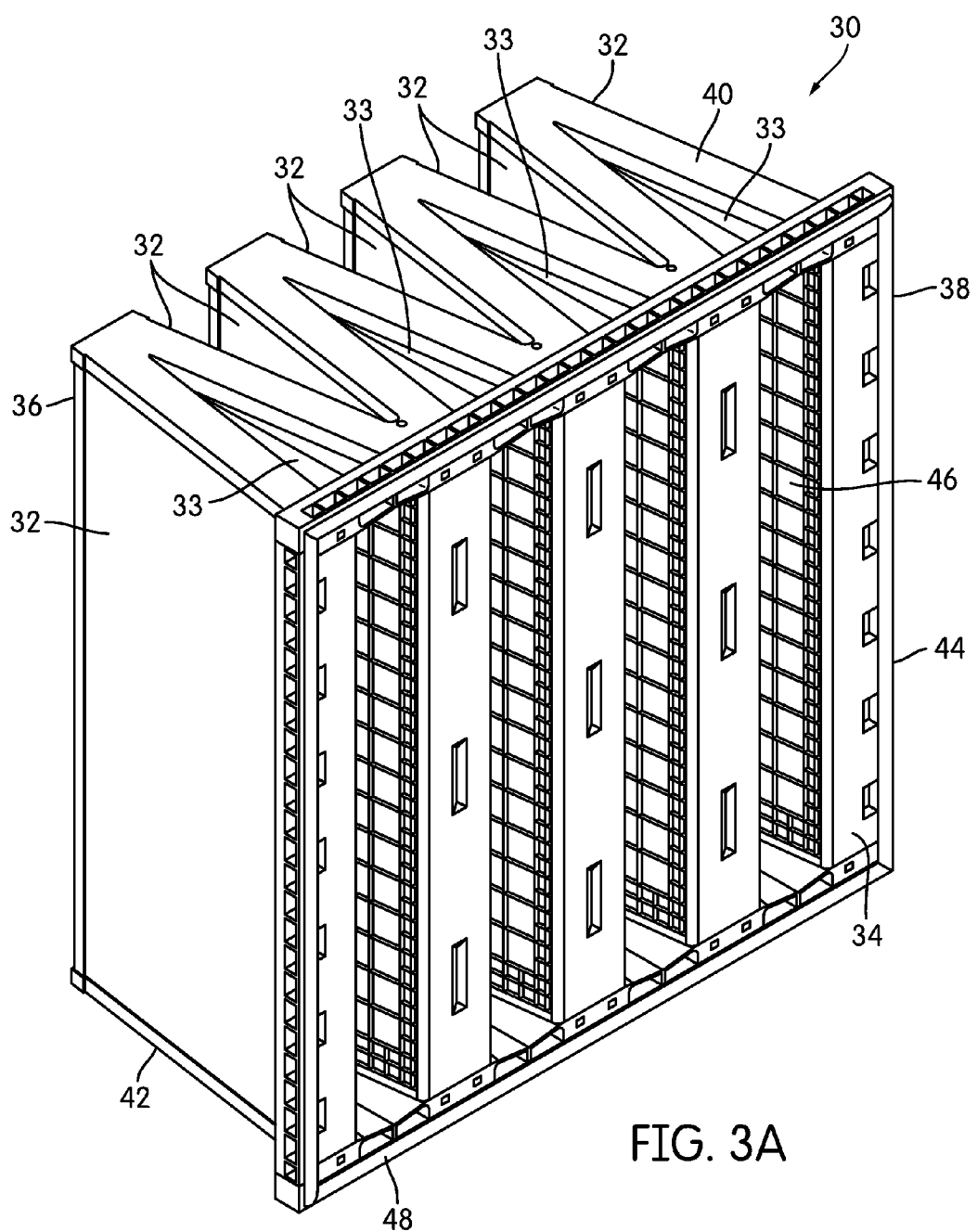
FIG. 3A is a perspective view of the filter element of FIG. 3 according to an exemplary embodiment.

With reference to FIG. 3A, in one embodiment, the filter element 30 is a V-cell filter and includes a plurality of filter panels 32, shown as eight filter panels 32 in FIG. 3A, arranged to form V-shapes and V-shaped voids 33. The filter panels 32 are rectangular and extend from a first side 34 (which may be an inlet side or an outlet side) to a second side 36 (which may be an inlet side or an outlet side). Fluid to be filtered is configured to flow in a direction between the first and second sides 34 and 36. The panels 32 each extend diagonally relative to the fluid flow path. The filter element 30 includes a frame construction 38 which includes opposed side panels 40 and 42 and a border flange, shown as rectangular border flange 44. The rectangular border flange 44 extends around and outwardly from the opposed side panels 40 and 42 and the filter media 46. The opposed side panels 40 and 42 and the rectangular border flange 44 may be integrally or separately formed. The filter element 30 also includes a seal 48 located on the rectangular border flange 44. In the illustrated embodiment, the seal 48 is located on the side of the rectangular border flange 44 proximate the first side 34. In other embodiments, the seal may be located on the opposite side of the rectangular border flange 44 (e.g., side proximate the second side). The seal 48 is configured to seal the filter element 30 in an opening in a partition and to prevent dirty fluid to be filtered from bypassing the filter element 30.

In other embodiments, other suitable numbers of panels 32 may be used. Each filter panel may include a plurality of pleats of filter media. Pleats in panels are not to be confused with the V-shaped voids 33 defined between adjacent panels 32. In other embodiments, filter panels may include corrugated filter media. In other embodiments, filter panels may include corrugated and pleated filter media.

Figure 3B:
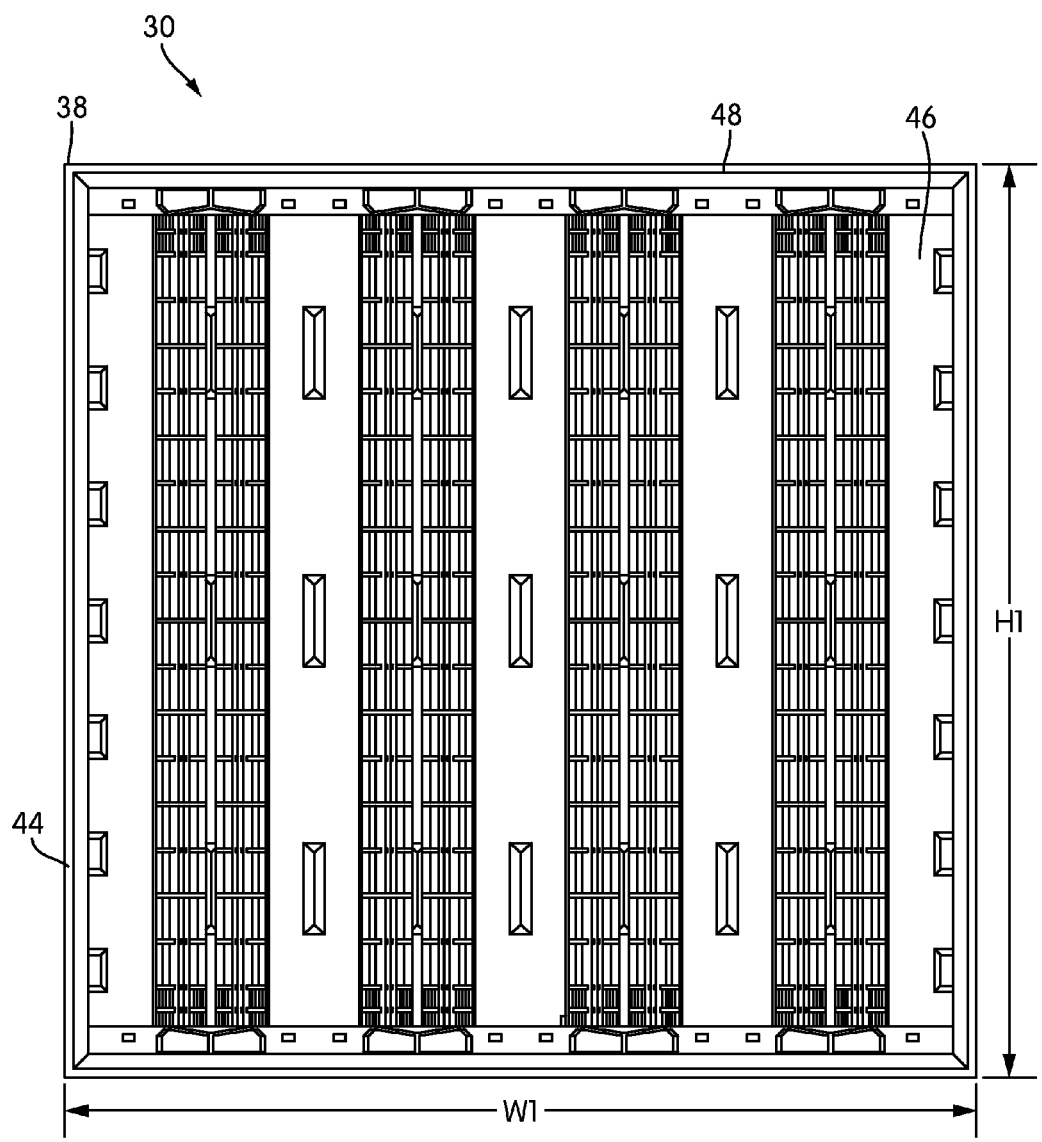
FIG. 3B is a front view of the filter element of FIG. 3 according to an exemplary embodiment.
Figure 3C:
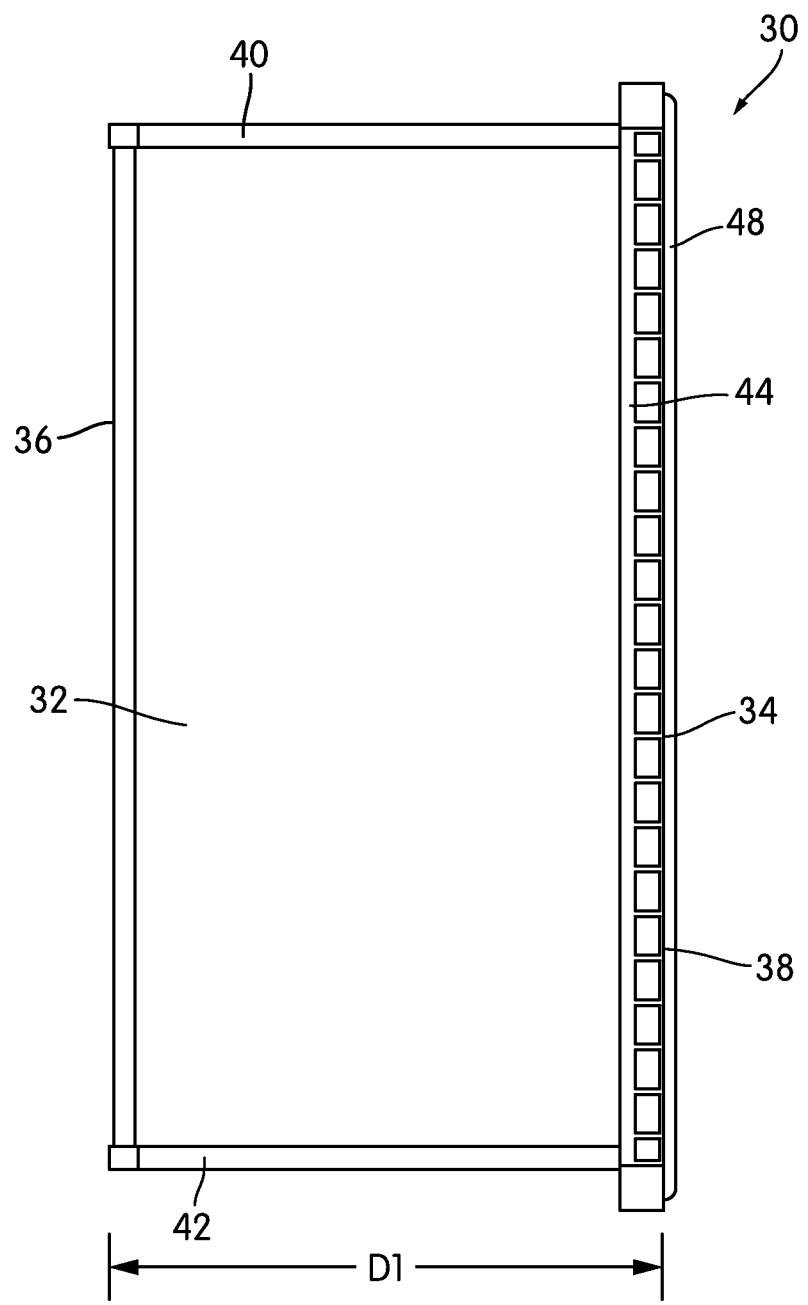
FIG. 3C is a side view of the filter element of FIG. 3 according to an exemplary embodiment.

With reference to FIGS. 3A-3C, the filter element 30 extends a height H1 and a width W1. In one embodiment, the height H1 is between one foot and three feet and the width W1 is between one foot and three feet. In one embodiment, the height H1 is two feet and the width W1 is two feet. In another embodiment, the height H1 is two feet and the width W1 is twenty inches. In another embodiment, the height H1 is two feet and the width W1 is three feet. In another embodiment, the height H1 is three feet and the width W1 is three feet. In one embodiment, the filter panels 32 extend a depth D1 in a direction between the first side 34 and the second side 36 of the filter element 30. In one embodiment, the depth D1 is at least four inches. In another embodiment, the depth D1 is between eight inches and twelve inches.

In another embodiment, the filter element 30 is a single panel V-pleat filter element, with pleats extending a depth of less than four inches.

With further reference to FIG. 3, in one embodiment, the filter frame adapter 28 includes opposed cover walls, shown as upper wall 50 and lower wall 52 spaced apart from the upper wall 50 and extending in a direction generally parallel to the upper wall 50. The upper wall 50 is configured to overlay the opposed side panel 40 of the filter element 30. The lower wall 52 is configured to overlay the opposed side panel 42 of the filter element 30. The upper wall 50 extends from a first end 54 to a second end 56. The lower wall 52 extends from a first end 58 to a second end 60. The filter frame adapter 28 includes a first rail 62 extending from the upper wall 50 proximate the first end 54 to the lower wall 52 proximate the first end 58. The filter frame adapter 28 also includes a second rail 64 spaced apart from the first rail 62 extending from the upper wall 50 proximate the first end 54 to the lower wall 52 proximate the first end 58.

Figure 4:
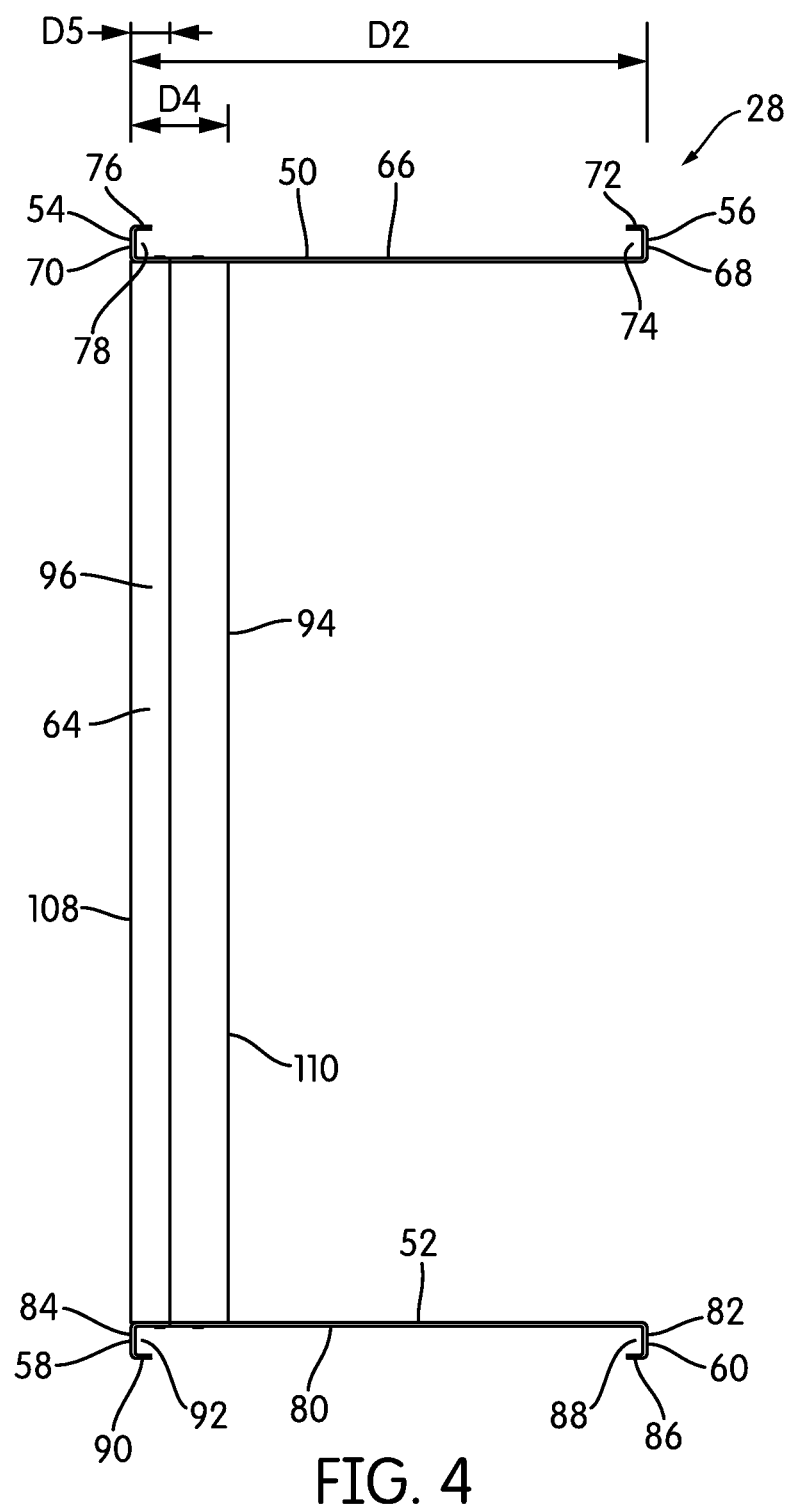
FIG. 4 is a side view of the filter frame adapter of FIG. 3 according to an exemplary embodiment.
Figure 5:
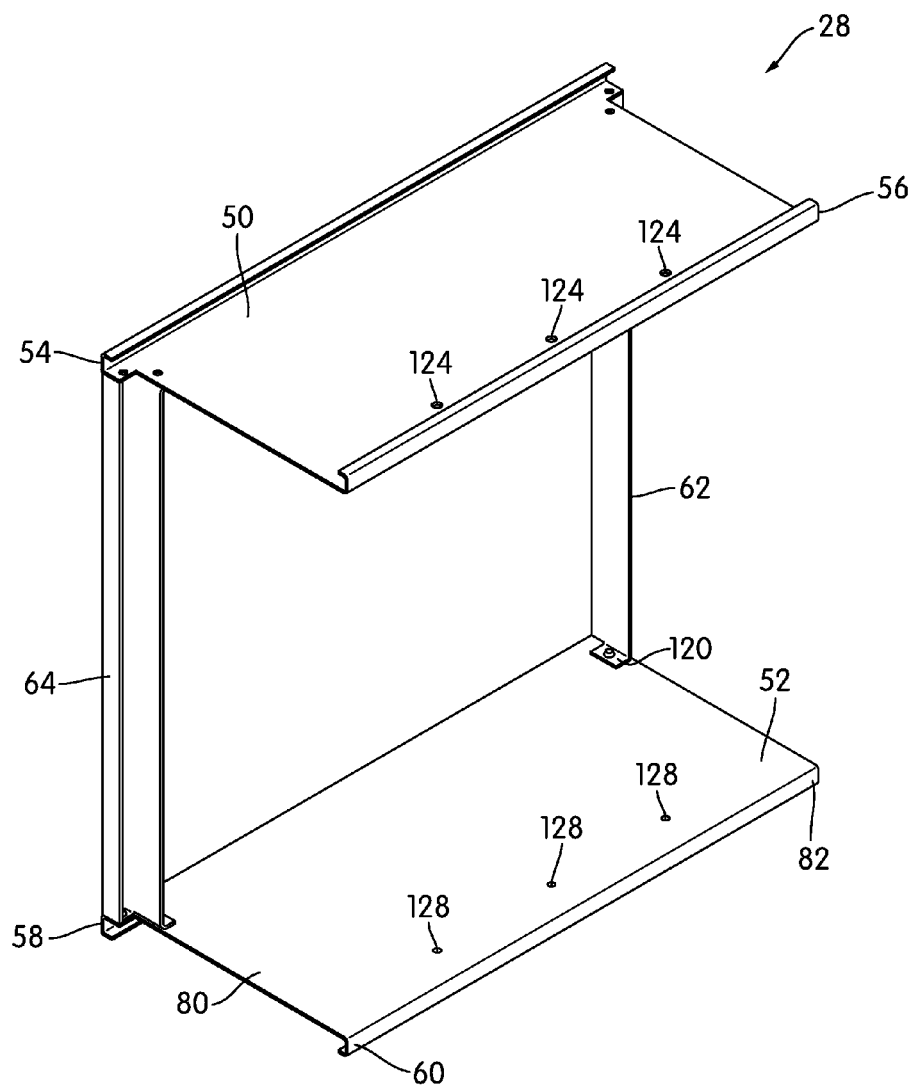
FIG. 5 is a perspective view of a filter frame adapter of FIG. 3 according to an exemplary embodiment.
Figure 6:
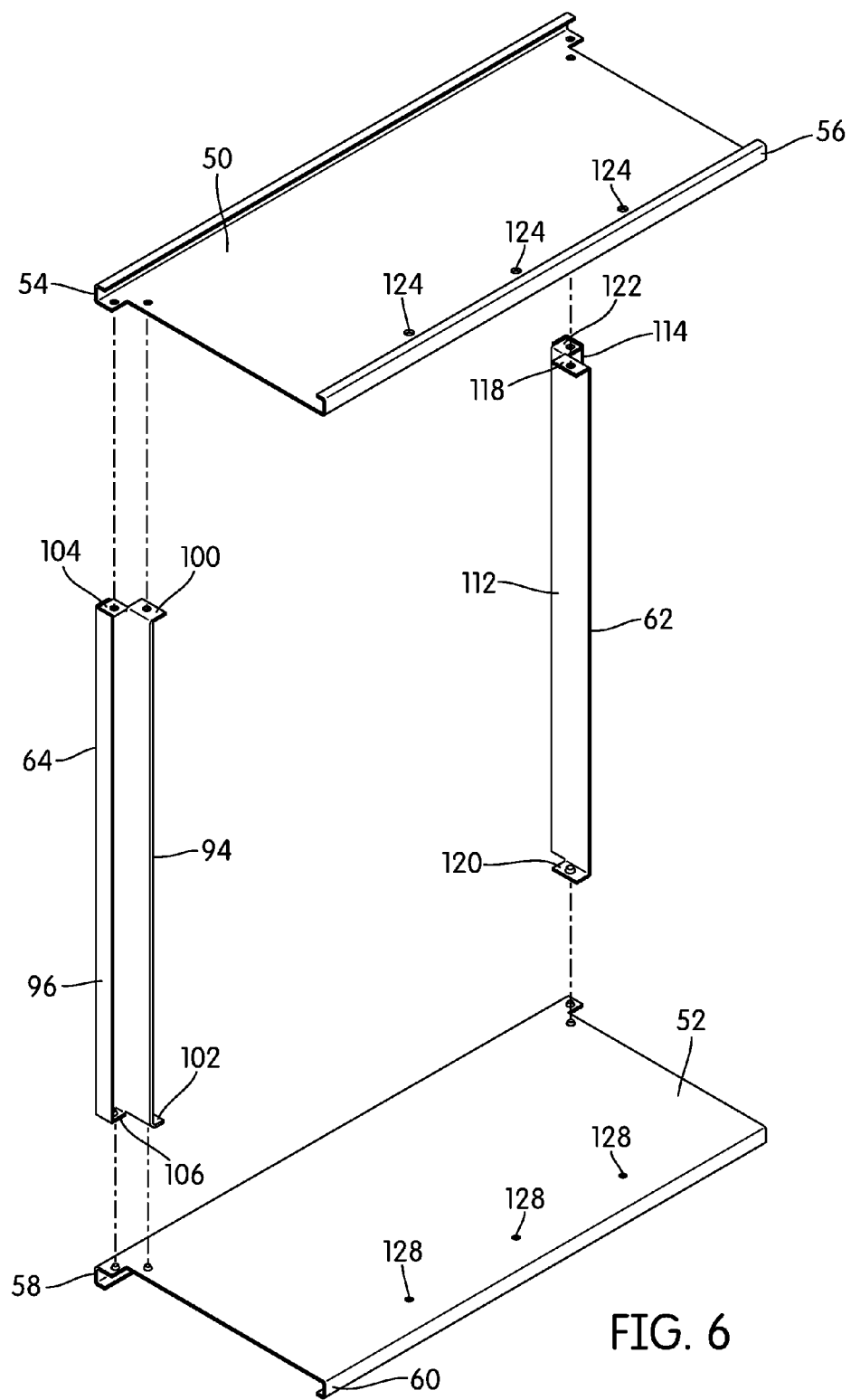
FIG. 6 is an exploded view of the filter frame adapter of FIG. 5 according to an exemplary embodiment.

With reference to FIG. 4, in one embodiment, the upper wall 50 extends a distance D2 from the first end 54 to the second end 56. The lower wall 52 also extends a distance D2 from the first end 58 to the second end 60.

With further reference to FIG. 4, in one embodiment, the upper wall 50 includes a central portion 66 and an end wall, shown as mounting flange 68 extending perpendicular to the central portion 66 at the second end 56. The mounting flange 68 is configured to abut the rectangular border flange 44. The central portion 66 also extends to a second end wall, shown as adapter flange 70 extending generally perpendicular to the central portion 66 at the first end 54. Extending over the central portion 66 from the end of the mounting flange 68 distal from the central portion 66 is a first channel wall 72. The first channel wall 72 extends parallel to the central portion 66. The first channel wall 72, the mounting flange 68, and the central portion 66 define a first channel 74 extending perpendicular to the directions D3 of the path of fluid flow (see FIG. 3). Extending over the central portion 66 from the end of the adapter flange 70 distal from the central portion 66 is a second channel wall 76. The second channel wall 76 extends parallel to the central portion 66. The second channel wall 76, the adapter flange 70, and the central portion 66 define a second channel 78 extending perpendicular to the directions D3 of the path of fluid flow (see FIG. 3). In one embodiment, clamps may be used to couple the filter frame adapter 28 to the filter element. The mounting flange 68 may be used to transfer clamping force to the rectangular border flange 44 of the filter element 30.

With further reference to FIG. 4, in one embodiment, the lower wall 52 includes a central portion 80 and an end wall, shown as mounting flange 82 extending perpendicular to the central portion 80 at the second end 60. The mounting flange 82 is configured to abut the rectangular border flange 44. The central portion 80 also extends to a second end wall shown as adapter flange 84 extending generally perpendicular to the central portion 80 at the first end 58. Extending under the central portion 80 from the end of the mounting flange 82 distal from the central portion 80 is a third channel wall 86. The third channel wall 86 extends parallel to the central portion 80. The third channel wall 86, the mounting flange 82, and the central portion 80 define a third channel 88 extending perpendicular to the directions D3 of the path of fluid flow (see FIG. 3). Extending under the central portion 80 from the end of the adapter flange 84 distal from the central portion 80 is a fourth channel wall 90. The fourth channel wall 90 extends parallel to the central portion 80. The fourth channel wall 90, the adapter flange 84, and the central portion 80 define a fourth channel 92 extending perpendicular to the directions D3 of the path of fluid flow (see FIG. 3).

With reference to FIGS. 3-6, the second rail 64 includes an inner wall 94, an outer wall 96, and a front wall 98 extending between the inner wall 94 and the outer wall 98. Extending generally perpendicular to the inner wall 94 are an inner upper flange 100 and an inner lower flange 102. In one embodiment, the flanges 100 and 102 each include an aperture configured to receive a fastener, e.g., bolt, etc., therethrough to couple the flanges 100 and 102 to the upper 50 and lower 52 walls respectively. In other embodiments, other suitable coupling mechanisms may be provided. Extending between the inner wall 94 and the outer wall 96 are outer upper flange 104 and outer lower flange 106. In one embodiment, the flanges 104 and 106 each include an aperture configured to receive a fastener, e.g., bolt, etc., therethrough to couple the flanges 104 and 106 to the upper 50 and lower 52 walls respectively. In other embodiments, other suitable coupling mechanisms may be provided. In one embodiment, the rails 62 and 64 are mirror images of one another. The first rail 62 includes an inner wall 112, an outer wall 114, and a front wall 116 extending between the inner wall 112 and the outer wall 114. Extending generally perpendicular to the inner wall 112 are an inner upper flange 118 and an inner lower flange 120. In one embodiment, the flanges 118 and 120 each include an aperture configured to receive a fastener, e.g., bolt, etc., therethrough to couple the flanges 118 and 120 to the upper 50 and lower 52 walls respectively. In other embodiments, other suitable coupling mechanisms may be provided. Extending between the inner wall 112 and the outer wall 114 are outer upper flange 122 and an outer lower flange (not visible in FIG. 6). In one embodiment, the outer upper flange 122 and the outer lower flange each include an aperture configured to receive a fastener, e.g., bolt, etc., therethrough to couple the outer upper flange 122 to the upper wall 50 and the outer lower flange to the lower wall 52.

With reference to FIG. 4, in one embodiment, the inner wall 94 of the second rail 64 extends a distance D4 in a direction from a first end 108 to a second end 110. The inner wall 112 of the first rail 62 (not visible in FIG. 4) also extends a distance D4. In one embodiment, the distance D4 is less than the distance D2 that the upper 50 and lower 52 walls extend such that the filter frame adapter 28 has partially open sides (see also, e.g., FIG. 2). In one embodiment, the outer wall 96 of the second rail 64 and the outer wall of the first rail 62 (not visible in FIG. 4) each extend a distance D5. In one embodiment, the distance D5 is less than the distance D4.

With further reference to FIG. 3, in one embodiment, the upper wall 50 includes coupling features, shown as three apertures 124 spaced apart proximate the second end 56. The filter element 30 includes three drain holes 126 defined in the side panel 40. The filter frame adapter 28 is configured such that the apertures 124 in the upper wall 50 align with the drain holes 126 when the filter element 30 is operatively engaged with the filter frame adapter 28, e.g., with the mounting flange 68 located against the rectangular border flange 44, to receive a fastener through each of the aperture 124 and drain hole 126 pairs to couple the filter element 30 to the filter frame adapter 28. The lower wall 52 includes coupling features, shown as three apertures 128 spaced apart proximate the second end 60. The filter element 30 also includes three drain holes defined in the side panel 42 (not visible in FIG. 3). The filter frame adapter 28 is configured such that the apertures 128 in the lower wall 52 align with the apertures in the side panel 42 when the filter element 30 is operatively engaged with the filter frame adapter 28, e.g., with the mounting flange 82 located against the rectangular border flange 44, to receive a fastener through each of the apertures 128 and drain hole pairs to couple the filter element 30 to the filter frame adapter 28. When the filter element 30 is to be removed from the filter frame adapter 28, the fasteners may be removed from the apertures to allow the filter element 30 to be removed from the filter frame adapter 28.

Figure 7:
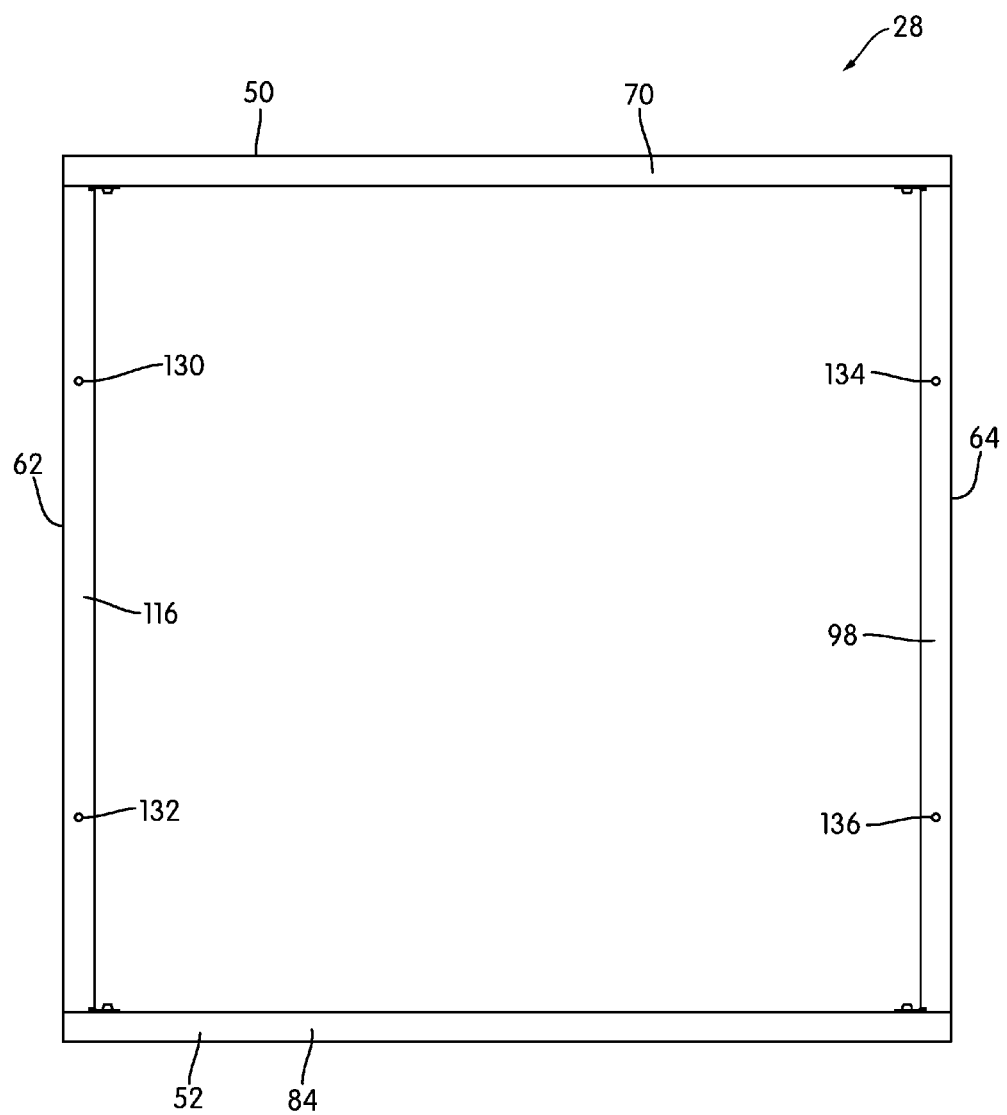
FIG. 7 is a front view of the filter frame adapter of FIG. 5 according to an exemplary embodiment.

With reference to FIG. 7, in one embodiment, the adapter flange 70 of the upper wall 50, the adapter flange 84 of the lower wall 52, the front wall 116 of the first rail 62, and the front wall 98 of the second rail 64 form a square, rigid front clamping surface extending around the perimeter of the filter element 30 (not shown in FIG. 7). In one embodiment, the filter frame adapter 28 is configured with a rectangular, rigid front clamping surface configured to withstand, e.g., not unacceptably deform, under a clamping load for clamping the filter frame adapter 28 in place the opening in a partition. In one embodiment, the front wall 116 of the first rail 62 includes coupling features shown as upper and lower throughbores 130 and 132. The front wall 98 of the second rail 64 includes coupling features shown as upper 134 and lower 136 throughbores. In one embodiment, the throughbores 130, 132, 134, and 136 are configured to receive fasteners, e.g., hooks, therethrough. The hooks may be coupled to springs which are configured to couple the filter frame adapter to a partition and to bias the seal of a filter element in a sealed configuration in an opening of a partition.

Figure 8:
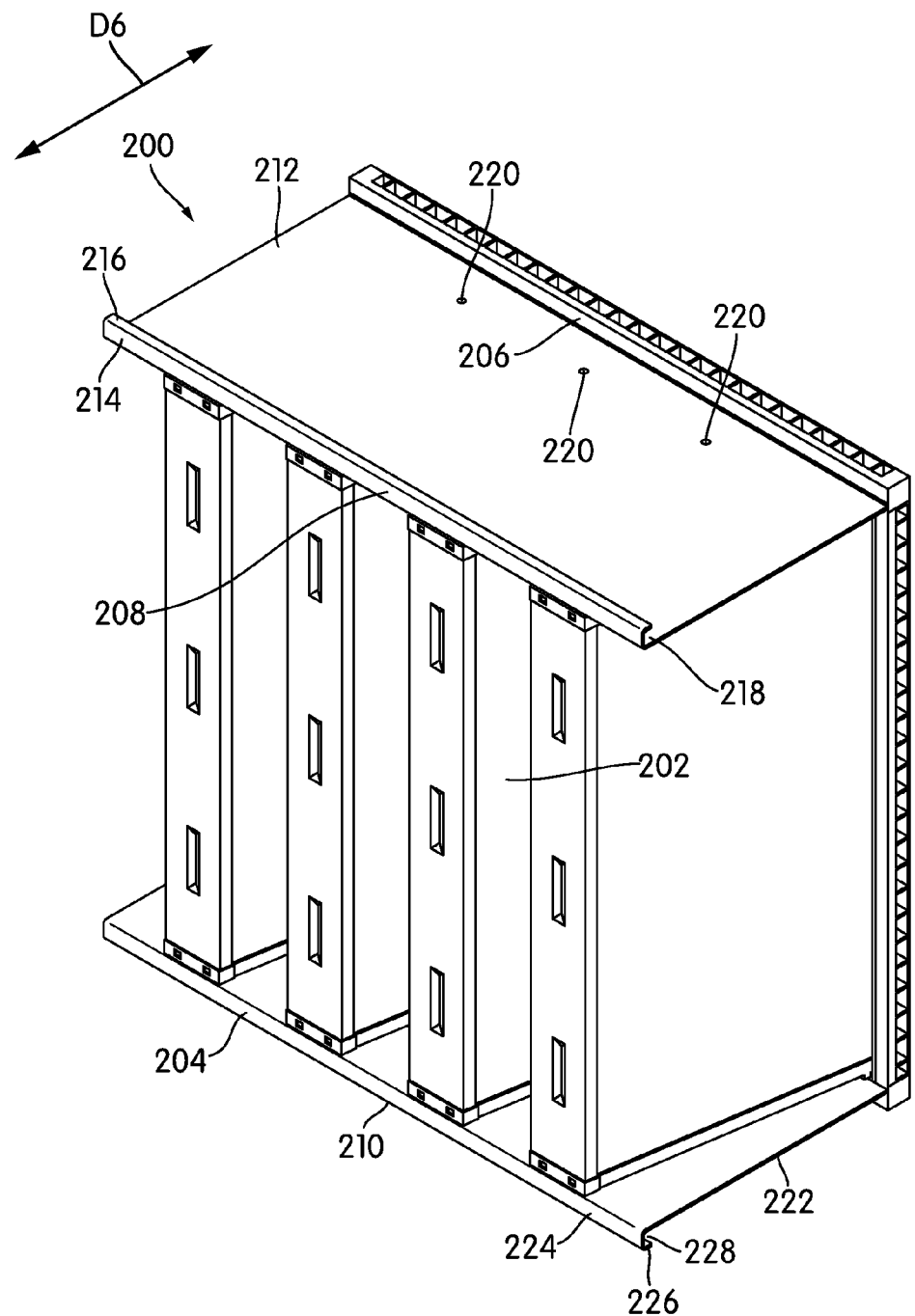
FIG. 8 is a perspective view of a filter unit according to an exemplary embodiment.

With reference to FIG. 8, another embodiment of a filter unit 200 is illustrated. The filter unit 200 includes a filer element 202 separately formed from and removably coupled to a filter frame adapter 204. The filter element 202 includes a rectangular border flange 206. The filter frame adapter 204 includes an upper wall 208 and a lower wall 210. The upper wall 208 includes a planar portion 212 extending away from the rectangular border flange 206 to an adapter flange 214 extending generally perpendicularly to the planar portion 212 spaced apart from the rectangular border flange 206. The upper wall 208 also includes a channel wall 216 extending from the adapter flange 214 over the planar portion 212. The channel wall 216, the adapter flange 214, and the planar portion 212 define a channel 218 extending perpendicular to the directions D6 of the path of fluid flow. The upper wall 208 includes a plurality of apertures 220 defined in the planar portion 212. The apertures 220 are configured to align with holes, such as, for example, drain holes (not visible in FIG. 8), of the filter element 202 such that fasteners may be located through the apertures 220 and in the drain holes to couple the upper wall 208 to the filter element 202. The lower wall 210 includes a planar portion 222 extending away from the rectangular border flange 206 to an adapter flange 224 extending generally perpendicularly to the planar portion 222 spaced apart from the rectangular border flange 206. The lower wall 210 also includes a channel wall 226 extending from the adapter flange 224 under the planar portion 222. The channel wall 226, the adapter flange 224, and the planar portion 222 define a channel 228 extending perpendicular to the directions D6 of the path of fluid flow. The lower wall 210 includes a plurality of apertures (not visible in FIG. 8) defined in the planar portion 222. The apertures are configured to align with drain holes (not visible in FIG. 8) of the filter element 202 such that fasteners may be located through the apertures and in the drain holes to couple the lower wall 210 to the filter element 202. In one embodiment, while the upper 208 and lower 210 walls are each coupled to the filter element 202, the upper 208 and lower 210 walls are not directly connected to one another. The adapter flanges 214 and 224 may be configured to allow mounting of the filter element 202 by various different mechanisms in openings of various different partitions.

Figure 9:
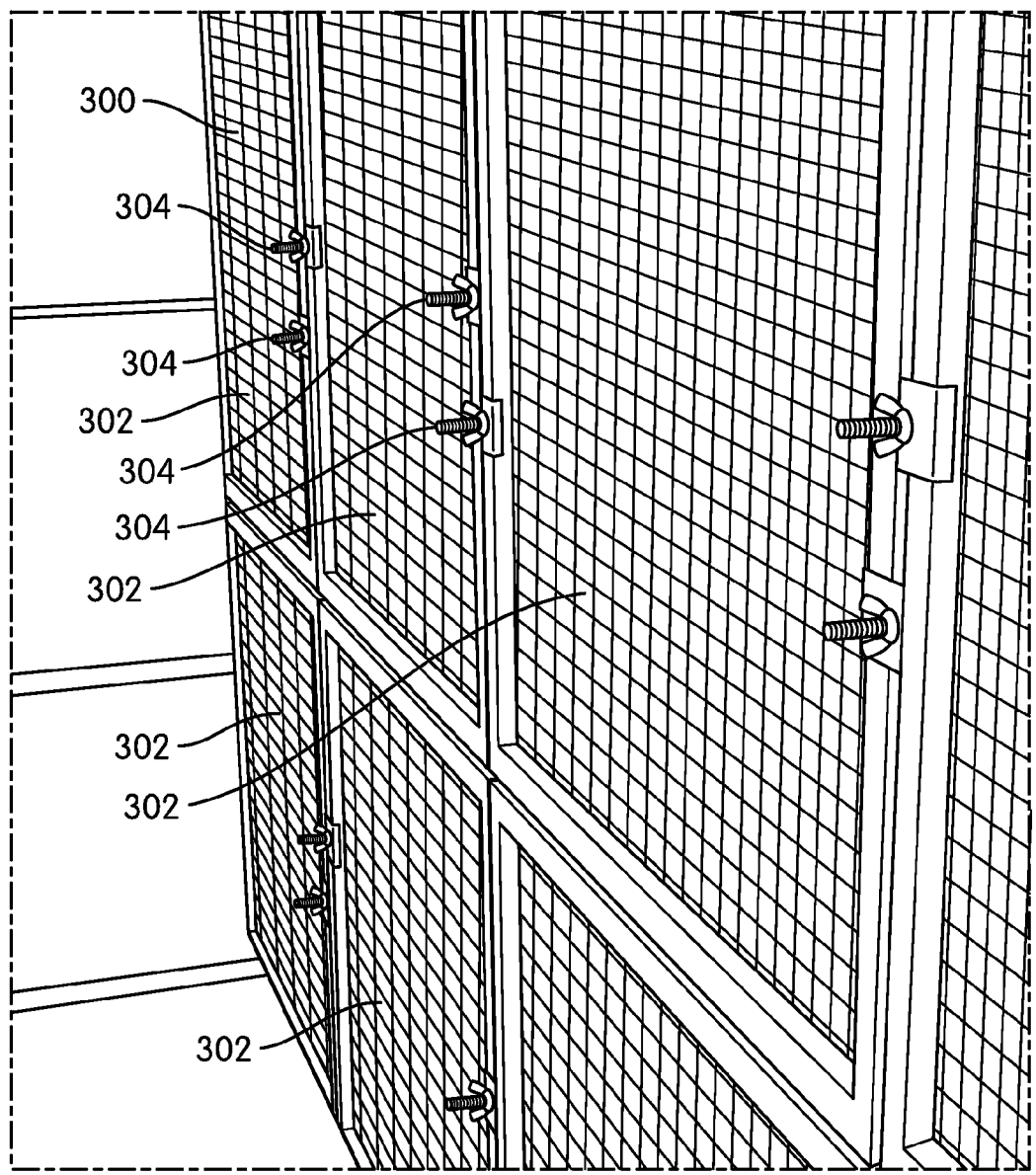
FIG. 9 is a perspective view of a partition according to an exemplary embodiment.

With reference to FIG. 9, another embodiment of a partition 300 is illustrated. The partition 300 includes a plurality of closures 302 preventing access to filter units (not visible in FIG. 9) located in openings in the partition 300. The closures 302 are held in a closed configuration by fasteners 304, shown in FIG. 9 as plates secured by nuts and bolts. The fasteners 304 may be manipulated to allow the closures 302 to be moved into an open configuration to allow removal of filter units. In one embodiment, the closures 302 provide loading to the filter as they press against the adapter flanges of the filter frame adapter (not visible in FIG. 9).

Figure 10:
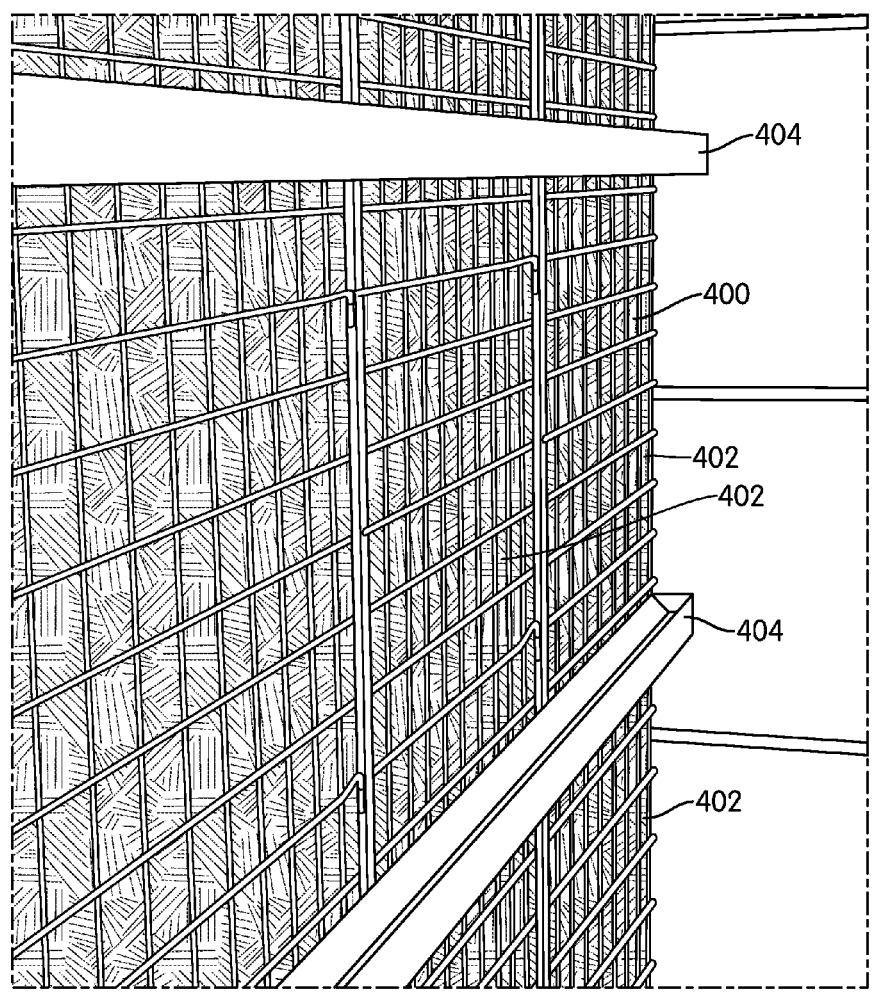
FIG. 10 is a perspective view of a partition according to an exemplary embodiment.

With reference to FIG. 10, another embodiment of a partition 400 is illustrated. The partition 400 includes a closure, shown as wire cage 402, preventing access to filter units (not visible in FIG. 10) located in openings in the partition 400. The wire cage is configured to hinge open to remove a pad located between the wire cage 402 and the filter units. In one embodiment, filter units located behind the pad may be held in place by an additional clamping mechanism. Water drain channels 404 are also provided.

Figure 11:
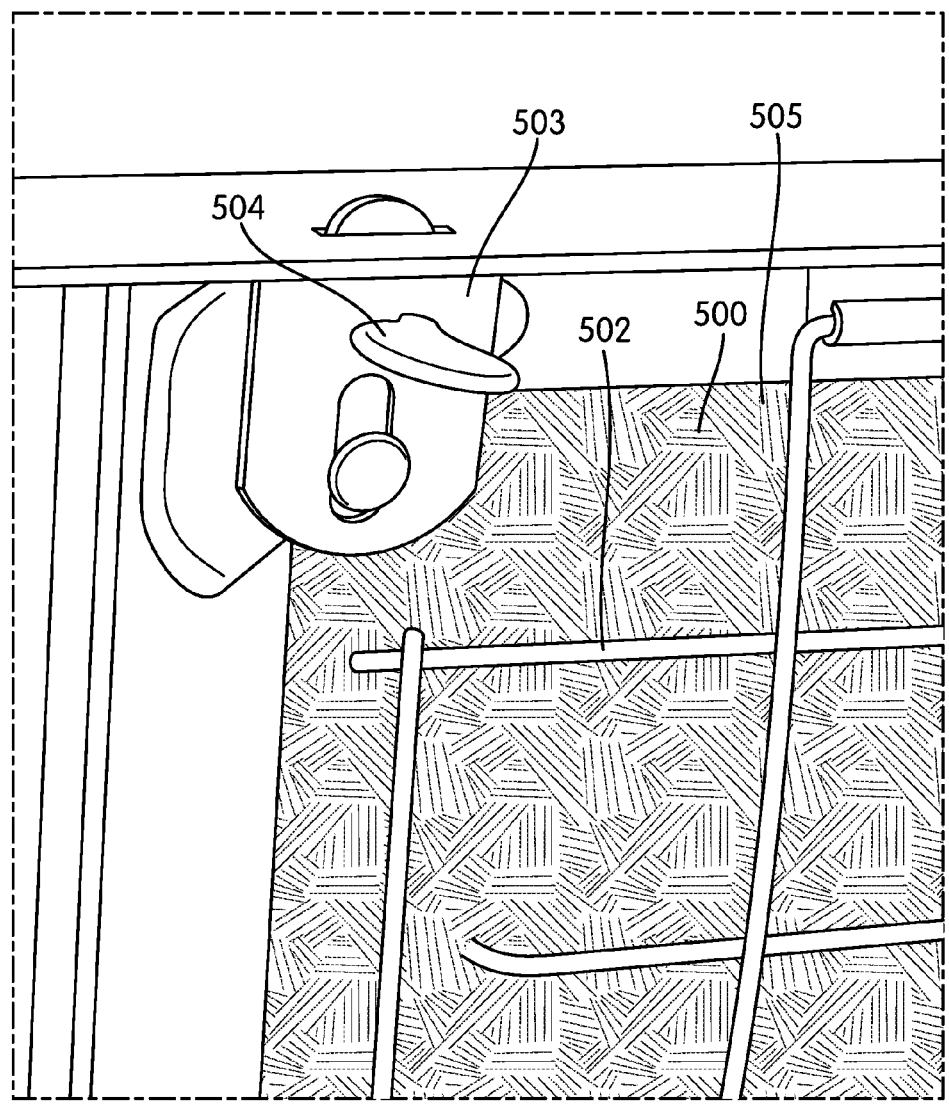
FIG. 11 is a detail perspective view of a fastener of a partition according to an exemplary embodiment.

With reference to FIG. 11, another embodiment of a partition 500 is illustrated. The partition 500 includes a plurality of closures 502 (only one shown in the detail view of FIG. 11) preventing access to filter units (not visible in FIG. 11) located in openings in the partition 500. The closure 502 is held in a closed configuration by a clamp 503 held in place by a fastener 504, shown in FIG. 11 as an eyebolt extending through a corner of the closure 502. The fastener 504 may be removed to allow the clamp 503 to be manipulated to allow the closure 502 to be moved into an open configuration to allow removal of filter units. The clamp 503 provides loading through a prefilter 505 located between the closure 502 and the filter unit to the filter unit, e.g., pressing against an adapter flange of a filter unit (not visible in FIG. 11).

Figure 12:
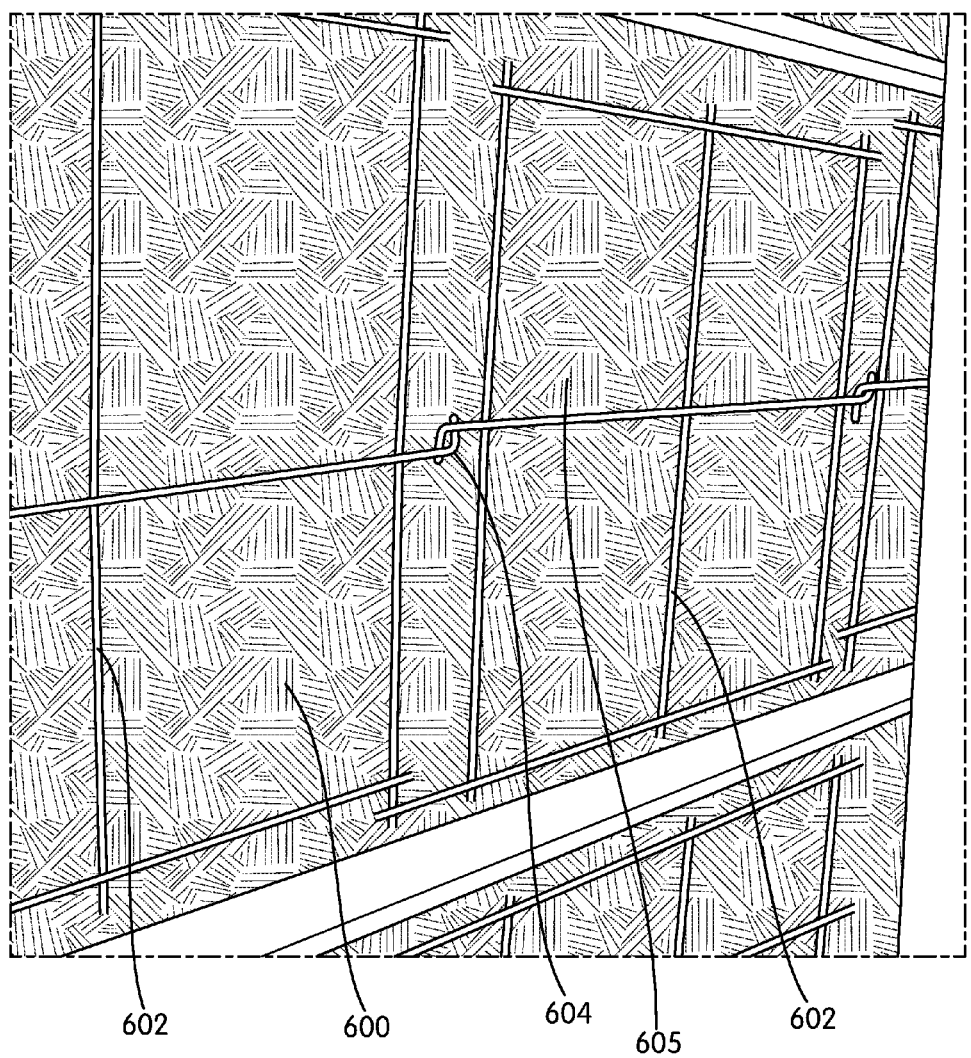
FIG. 12 is a detail perspective view of a fastener of a partition according to an exemplary embodiment.

With reference to FIG. 12, another embodiment of a partition 600 is illustrated. The partition 600 includes a plurality of closures shown as wire cages 602 preventing access to filter units (not visible in FIG. 12) located in openings in the partition 600. The closures 602 are held in a closed configuration by a fastening configuration 604. In one embodiment, the wire cages 602 hold a pad 605 in place located between the wire cages 602 and the filter units. In one embodiment, the filter units may be clamped in openings in the partition 600 by a clamping mechanism (not visible in FIG. 12) located between the pad 605 and the filter units.

Figure 13:
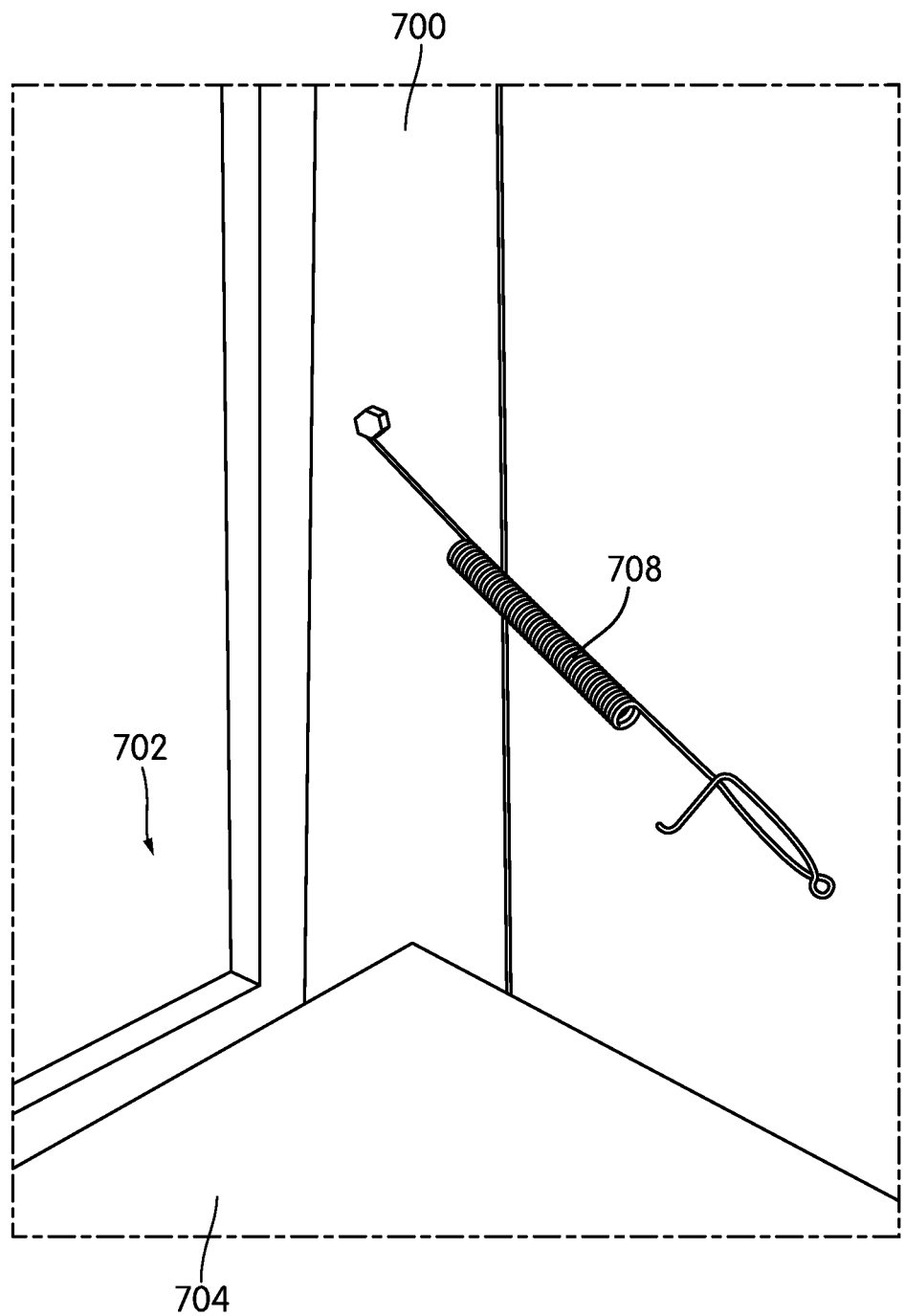
FIG. 13 is a perspective view of a partition with a closure in an open configuration and a filter unit removed from an opening in the partition according to an exemplary embodiment.
Figure 14:
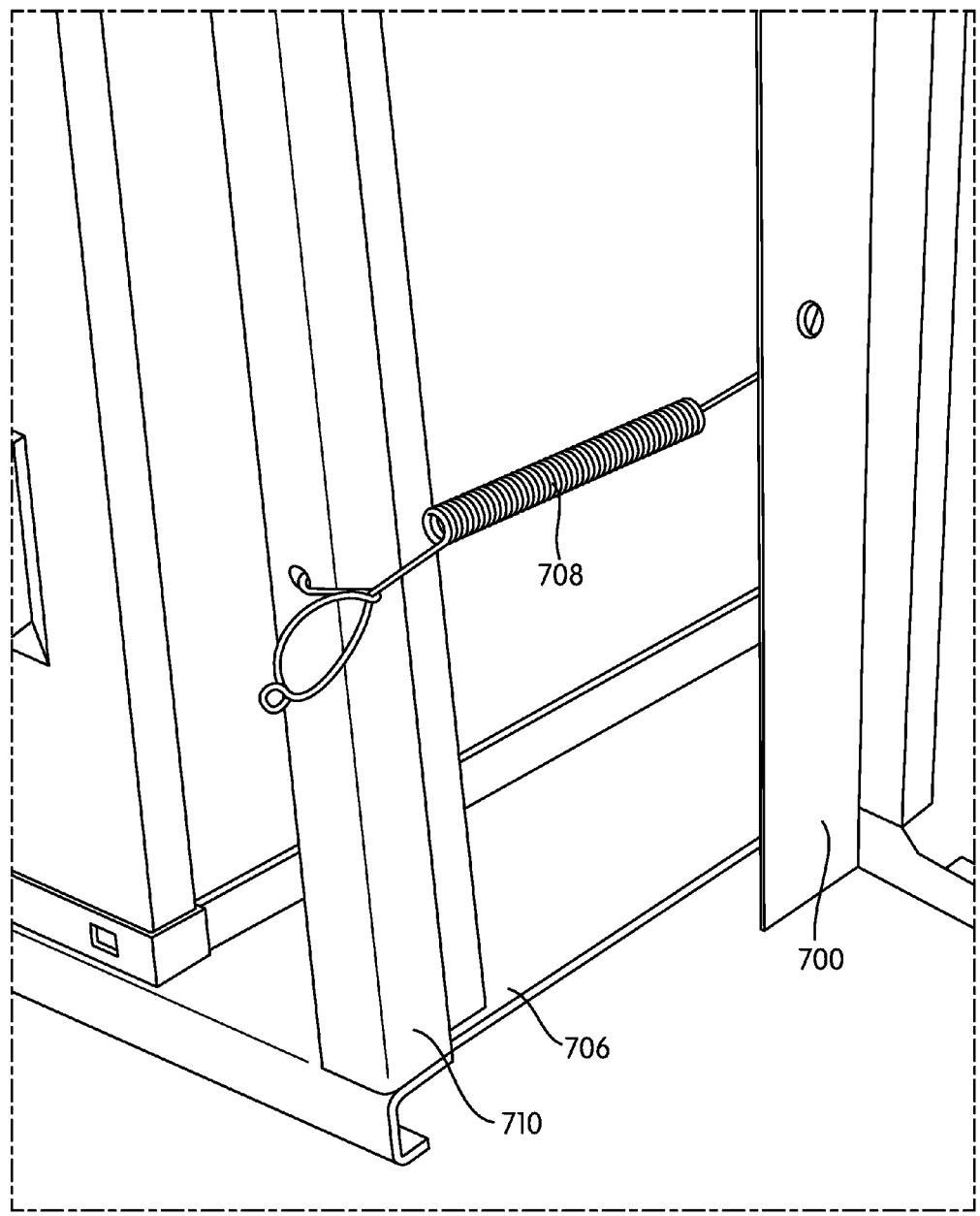
FIG. 14 is a perspective view of a partition with a closure in an open configuration and a filter unit located in an opening in the partition according to an exemplary embodiment.

With reference to FIGS. 13 and 14, another embodiment of a partition 700 is illustrated. An opening 702 is defined in the partition 700. A closure 704, shown in an open configuration in FIG. 13, is provided to selectively prevent and allow access to a filter unit 706 located in the opening 702. Fasteners 708, shown as springs are provided. One end of each of the fasteners 708 is coupled to the partition 700 while the other end of each of the fasteners 708 is coupled to the filter frame adapter 710, e.g., inserted through apertures in the filter frame adapter 710. The fastener 708 biases the filter unit 706 into the opening 702, providing sealing between the filter unit 706 and the partition 700.

Figure 15:
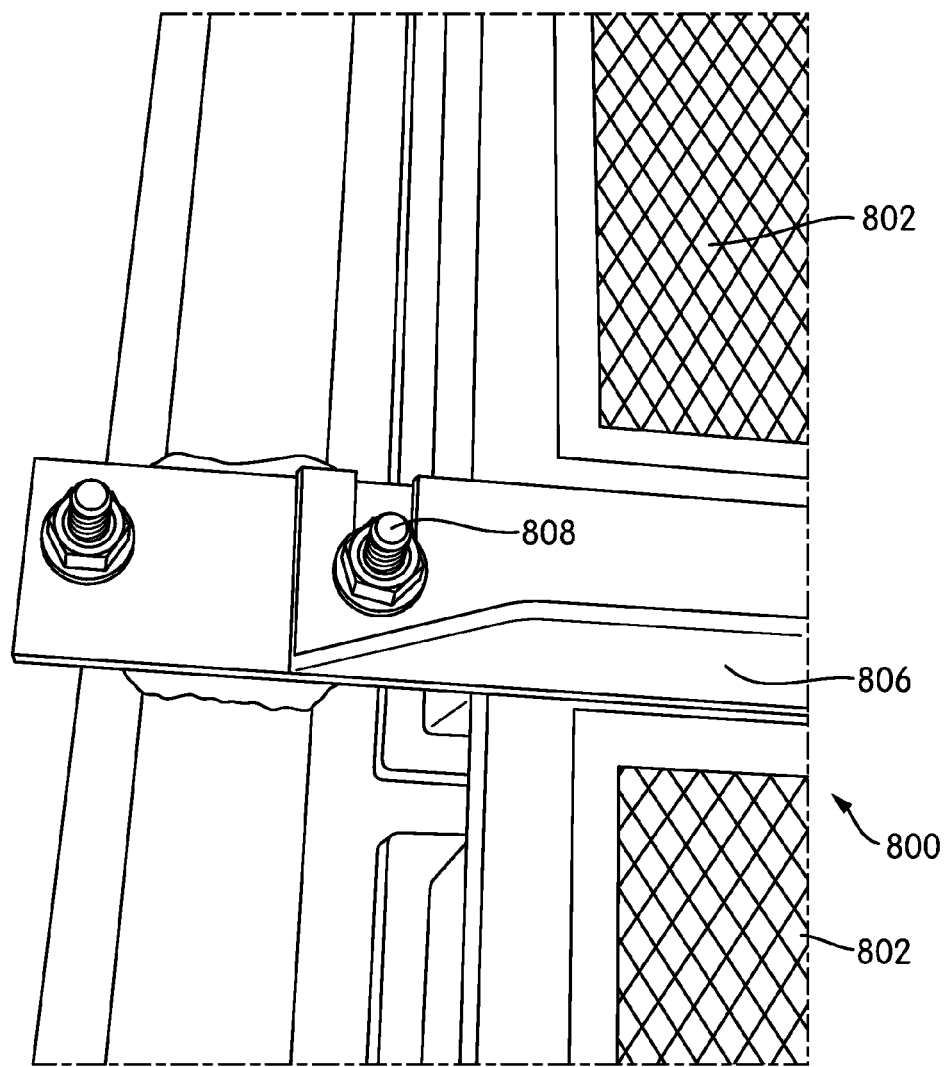
FIG. 15 is a detail perspective view of a fastener of a partition according to an exemplary embodiment.

With reference to FIG. 15, another embodiment of a partition 800 is illustrated. The partition 800 includes a plurality of closures 802 preventing access to filter units (not visible in FIG. 15) located in openings in the partition 800. The closures 802 are held in a closed configuration by a fastener 804, shown in FIG. 15 as a bar extending across and preventing opening of closures 802. An adjustment mechanism 806, shown as a nut and bolt pair, may be adjusted to allow movement of the fastener 804 to allow moving the closures 802 into an open configuration to allow removal of filter units.

Embodiments of filter frame adapters described herein may be used with various different types and sizes of filters to allow these various different types of filters to be installed into partitions. For example, ALTAIR 12" or 17" VCELL filters, commercially available from Clarcor Industrial Air, may be used with embodiments of filter frame adapters 28 described here. In other embodiments, other suitable types of filters may be used.

Embodiments of filter frame adapters may be formed from metal, e.g., galvanized iron or steel, stainless steel, etc. In other embodiments, filter frame adapters may be formed from rigid plastic. In other embodiments, other suitable materials may be used.

Certain terminology is used herein for convenience only and is not to be taken as a limitation on the present invention. Relative language used herein is best understood with reference to the drawings, in which like numerals are used to identify like or similar items.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A filter apparatus, comprising:
    a filter element including filter media supported in a frame construction, the frame construction having opposed side panels and a rectangular border flange along a first end, the rectangular border flange projecting outward from and extending around the opposed side panels, the first end being an inlet end or an outlet end of the filter element;
    a filter frame adapter formed separately from the frame construction and removably secured to the frame construction to adapt the filter element for a different mounting interface, the filter frame adapter including a pair of complimentary adapter flanges each projecting outward relative to one of the opposed side panels, the adapter flanges at a second end that is opposite a first end, the second end being at the inlet end or the outlet end.

2. The filter apparatus of claim 1, wherein the filter element is a V-cell filter including at least two filter panel shaped members with adjacent filter panels diverging away from each other with a V-shaped void therebetween, each panel extending between the inlet end and the outlet end.

3. The filter apparatus of claim 2, wherein each panel includes media, the media being pleated within each panel.

4. A method of replacing filter media of a filter apparatus, the method comprising:
    removing the filter apparatus of claim 1 from an opening in a partition;
    removing a fastener from aligned apertures in the filter element having filter media and a flange extending around the filter media and the filter frame adapter extending from a first end to a second end having an upper mounting surface and a lower mounting surface at the second end each configured to mount to a flange of the first filter, the filter frame adapter also including a four-sided perimeter configured to extend around the filter media at the second end;

aligning apertures in a second filter element having filter media and a flange extending around the filter media with the apertures of the filter frame adapter;

locating the fastener in the aligned apertures of the filter frame adapter and the second filter element to couple the second filter element to the filter frame adapter; and coupling the filter frame adapter in the opening to the partition.

5. The method of claim 4, wherein the filter element includes at least two filter panels arranged to form a V-shape; and wherein the second filter element includes at least two filter panels arranged to form a V-shape.

6. The method of claim 4, wherein the second filter element is a V-pleat filter.

7. A filter apparatus, comprising:

a filter element including filter media supported in a frame construction, the frame construction having opposed side panels and a rectangular border flange along a first end, the rectangular border flange projecting outward from and extending around the opposed side panels, the first end being an inlet end or an outlet end of the filter element;

a filter frame adapter formed separately from the frame construction and secured to the frame construction to adapt the filter element for a different mounting interface, the filter frame adapter including a pair of complimentary adapter flanges each projecting outward relative to one of the opposed side panels, the adapter flanges at a second end that is opposite a first end, the second end being at the inlet end or the outlet end;

wherein the filter frame adapter includes opposed cover walls overlaying the opposed side panels, the adapter flanges each projecting from one of the cover walls at the second end and the cover walls being secured to the opposed side panels.

8. The filter apparatus of claim 7, wherein the filter frame adapter includes opposed channel walls extending from each of the adapter flanges over each of the cover walls and wherein channels are defined along an exterior of the filter apparatus by each of the opposed cover walls, respective adapter flanges, and opposed channel walls.

9. The filter apparatus of claim 7, wherein the cover walls are formed from metal and the side panels are formed from plastic, further comprising fasteners securing the cover walls and the side panels.

10. The filter apparatus of claim 7, further comprising first and second rails in parallel spaced relation connecting opposed edges of the cover walls to provide a rectangular self-supporting structure to the filter frame adapter, and mounting flanges projecting outwardly from each of the cover walls.

11. The filter apparatus of claim 10, wherein the rails and the adapter flanges provide a second rectangular border flange at the first end in spaced parallel relation to the rectangular border flange.

12. The filter apparatus of claim 7, wherein the opposed side panels define drain holes, wherein the cover walls define mounting apertures aligned with the drain holes, further comprising fasteners extending through the cover walls and the drain holes to couple the filter frame adapter to the filter element.

13. The filter apparatus of claim 7, wherein the filter frame adapter is permanently secured to the frame construction.

14. The filter apparatus of claim 7, wherein the filter frame adapter is releasably secured to the frame construction.

15. A filter apparatus, comprising:

a filter element including filter media supported in a frame construction, the frame construction having opposed side panels and a rectangular border flange along a first end, the rectangular border flange projecting outward from and extending around the opposed side panels, the first end being an inlet end or an outlet end of the filter element;

a filter frame adapter formed separately from the frame construction and secured to the frame construction to adapt the filter element for a different mounting interface, the filter frame adapter including a pair of complimentary adapter flanges each projecting outward relative to one of the opposed side panels, the adapter flanges at a second end that is opposite a first end, the second end being at the inlet end or the outlet end;

wherein the filter frame adapter further comprises:

a first wall extending from the first end to the second end, the first wall including a central portion and an end wall extending perpendicular to the central portion at the second end, the end wall providing one of the adapter flanges, which is configured to abut the border flange of the filter;

a second wall spaced apart from the first wall and extending from the first end to the second end, the second wall including a central portion extending parallel to the central portion of the first wall and an end wall extending perpendicular to the central portion at the second end, the end wall providing one of the adapter flanges, which is configured to abut the border flange of the filter;

a first rail extending between the first wall and the second wall; and a second rail, spaced apart from the first rail, extending between the first wall and the second wall;

wherein the first wall, the second wall, the first rail, and the second rail form a four-sided perimeter at the first end of the filter frame adapter extending around the filter.

16. The filter frame adapter of claim 15, wherein the first wall includes a second end wall extending generally perpendicular to the central portion at the first end of the first wall; and wherein the second wall includes a second end wall extending generally perpendicular to the central portion at the first end of the second wall.

17. The filter frame adapter of claim 15, wherein the first rail includes a first coupling feature configured to receive a fastener to couple the filter frame adapter to a partition; and wherein the second rail includes a second coupling feature configured to receive a fastener to couple the filter frame adapter to the partition.

18. The filter frame adapter of claim 17, wherein the first rail includes an inner wall, an outer wall, and a front wall extending between the inner wall and the outer wall;

wherein the first coupling feature includes a first pair of throughbores each extending through the front wall of the first rail;

wherein the second rail includes an inner wall, an outer wall, and a front wall extending between the inner wall and the outer wall; and wherein the second coupling feature includes a second pair of throughbores each extending through the front wall of the second rail.

19. The filter frame adapter of claim 15, wherein the first wall extends a first distance from the first end to the second end;
- wherein the first rail includes an inner wall extending a second distance from a first end to a second end ; and
- wherein the first distance is greater than the second distance.

20. The filter frame adapter of claim 19, wherein the first rail includes an outer wall extending a third distance from a first end to a second end; and
- wherein the third distance is less than the second distance.

21. The filter apparatus of claim 15, wherein the first wall and the second wall form a two-sided perimeter proximate the second end of the filter frame adapter.

22. The filter apparatus of claim 15, wherein the filter frame adapter is permanently secured to the frame construction.

23. The filter apparatus of claim 15, wherein the filter frame adapter is releasably secured to the frame construction.

24. A filter apparatus, comprising:
- a filter element including filter media supported in a frame construction, the frame construction having opposed side panels and a rectangular border flange along a first end, the rectangular border flange projecting outward from and extending around the opposed side panels, the first end being an inlet end or an outlet end of the filter element;
- a filter frame adapter formed separately from the frame construction and secured to the frame construction to adapt the filter element for a different mounting interface, the filter frame adapter including a pair of complimentary adapter flanges each projecting outward relative to one of the opposed side panels, the adapter flanges at a second end that is opposite a first end, the second end being at the inlet end or the outlet end;
- wherein the filter element is a V-cell filter and wherein the filter adapter is configured to couple the V-cell filter to a partition, wherein the filter adapter further comprises:
- a first wall including a central portion extending from the first end to the second end, a first end wall located at the first end, and a second end wall located at the second end;
- a second wall including a central portion extending from the first end to the second end, a first end wall located at the first end, and a second end wall located at the second end;
- a first rail extending between the first wall and the second wall;
- a second rail spaced apart from the first rail and extending between the first wall and the second wall; and
- a fastener configured to couple the filter frame adapter to the V-cell filter;
- wherein at least one of the walls includes a first coupling feature configured to allow the filter frame adapter to be releasably coupled to the partition.

25. The filter frame adapter of claim 24, further comprising a first channel wall extending from the first end wall of the first wall over the central portion, the first channel wall, the first end wall, and the central portion defining a first channel and a second channel wall extending from the first end wall of the second wall under the central portion, the second channel wall, the second end wall, and the central portion defining a second channel.

* * * * *